(12) United States Patent
Uematsu et al.

(10) Patent No.: US 6,299,263 B1
(45) Date of Patent: Oct. 9, 2001

(54) AUTOMATIC RETARDER CONTROLLER

(75) Inventors: Kouji Uematsu, Kodaira; Nobuki Hasegawa, Oyama, both of (JP)

(73) Assignee: Komatsu, LTD, Tokyo (JP)

( * ) Notice: Subject to any disclaimer, the term of this patent is extended or adjusted under 35 U.S.C. 154(b) by 0 days.

(21) Appl. No.: 09/381,804

(22) PCT Filed: Mar. 24, 1998

(86) PCT No.: PCT/JP98/01254

§ 371 Date: Sep. 24, 1999

§ 102(e) Date: Sep. 24, 1999

(87) PCT Pub. No.: WO98/42551

PCT Pub. Date: Oct. 1, 1998

(30) Foreign Application Priority Data

Mar. 26, 1997 (JP) .................................................. 9-93061

(51) Int. Cl.⁷ .................................................... B60T 8/32
(52) U.S. Cl. ........................ 303/192; 303/123; 303/125
(58) Field of Search ................... 303/192, 121, 303/123, 125, 129, 131; 188/DIG. 4

(56) References Cited

U.S. PATENT DOCUMENTS

| | | | |
|---|---|---|---|
| 4,467,428 | * 8/1984 | Caldwell | 180/170 |
| 4,477,124 | * 10/1984 | Watanabe | 303/100 |
| 5,197,564 | * 3/1993 | Nishimura et al. | 180/179 |
| 5,484,044 | * 1/1996 | Bersteinas et al. | 188/353 |
| 5,941,614 | * 8/1999 | Gallery et al. | 303/192 |

* cited by examiner

Primary Examiner—Robert J. Oberleitner
Assistant Examiner—Devon Kramer
(74) Attorney, Agent, or Firm—Armstrong, Westerman, Hattori, McLeland & Naughton, LLP

(57) ABSTRACT

An automatic retarder controller for a vehicle, which can prevent overheating, and can more precisely control the vehicle speed to remain constant. For this purpose, in the automatic retarder controller which is mounted on a load-carrying vehicle together with a cooled retarder (31) for exerting a braking force in response to a driving signal, and which automatically controls the driving signal so that the slope descending speed of the vehicle remains nearly constant, a detector for detecting the loading weight of the vehicle is included, and the controller impresses the gain corresponding to the detected loading weight upon the driving signal while the controller controls the vehicle speed to remain constant.

8 Claims, 5 Drawing Sheets

AUTOMATIC RETARDER CONTROLLER

TECHNICAL FIELD

The present invention relates to an automatic retarder controller for automatically controlling a cooled retarder mounted on a mine dump truck.

BACKGROUND ART

A mine dump truck or the like is provided with a retarder (a continuous braking device), which is controlled to keep a vehicle speed constant while the truck or the like is descending a long downhill road. There are various types of retarders: an electromagnetic type, an exhaust type, an air type, a hydraulic type, and so forth, and an electromagnetic type, a hydraulic type, and the like are cooled type.

For example, in an oil-cooled multiple disc type retarder, a plurality of vehicle body side plates (fixed side plates) and a plurality of wheel side plates (rotating side plates) are alternately placed adjacently to each other to be separable from each other, and cooling oil flows between both plate surfaces. While braking with the retarder (specifically, when the retarder is applied), a negative pressure (an oil pressure Pp) is given to the end plate to allow all the plates to slide while the surfaces of all plates contact one another, whereby obtaining a sliding friction force as a braking force. In other words, the more the oil pressure Pp is increased, the more the braking force increases, and the more the circumferential speed of the wheel side plates decreases. The oil pressure Pp is adjusted by means of a retarder lever in a manual control type, while in an automatic control type, it is adjusted by a command from a controller. In this situation, braking energy is proportional to the product of the oil pressure Pp and the circumferential speed of the rotating side plates, and comes out as heat generation. This heat generation is absorbed in cooling oil, and the cooling oil is cooled by means of a heat exchanger. The cooling oil from the heat exchanger flows between the plates again by means of a hydraulic pump rotated by an engine. Consequently, in a cooled type retarder, a vehicle speed is controlled to remain constant and not more than a maximum vehicle speed Vmax at which the heat balance of the vehicle and the retarder can be maintained. The explanation is made below with the above oil-cooled multiple disc type retarder taken as an example.

The control of the vehicle speed to remain constant by means of the retarder is as follows in concrete. A manual control is taken as an example in the description. In view of the loading weight, the gradient and the distance of a downhill road, an operator previously knows the maximum vehicle speed Vmax at which the heat balance can be maintained. When applying the retarder while descending a downhill road, the operator initially coasts the vehicle and manipulates a retarder lever so that the vehicle speed remains not more than the maximum vehicle speed Vmax and constant in the coasting state. The manipulated variable of the retarder lever is proportional to the braking force of the retarder, and the braking force is inversely proportional to the vehicle speed. In this situation, the operator shifts a transmission lever to a gear of the transmission with which the desired vehicle speed V ($\leq$Vmax) is obtained. In a vehicle having a plurality of gears and an automatic transmission which automatically shifts the gear based on the vehicle speed V, the automatic transmission automatically shifts to a gear with which the vehicle speed V is obtained. It should be noted that the above "coast" means the state in which the operator removes his or her foot from the accelerator pedal to allow the vehicle to travel by inertia.

In the above cooled retarder, the following are known as an automatic retarder controller having a switch system switch for switching between the manual control and automatic control and various detectors, receiving a switching signal to the automatic control from the aforementioned switch system, and thereafter automatically controlling, the retarder based on detected information from the detectors.

An automatic retarder controller in the first example has an engine speed detector, and automatically controls the retarder so that the engine speed from the engine speed detector matches a reference engine speed previously stored, irrespective of the manipulated variable of the retarder lever.

Only one reference engine speed is set in the above first example. However, firstly, there is a disadvantage that the vehicle speed is greatly fluctuated according to the slippery conditions of a road surface, the loading weight, the gradient of a downhill road, and the like even at the same engine speed. Secondly, since the same engine speed exists in each gear, if abrupt braking is exerted by means of a foot brake, for example, the speed decreases to shift down to a lower gear, and matches the reference engine speed of the gear, thereby causing substantial reduction of speed. Likewise, if an accelerator pedal is depressed, the speed increases to shift up, and matches the reference engine speed of the gear, thereby causing substantial increase in the speed. Specifically, there is the disadvantage of causing speed change shock. Thirdly, the reference engine speed in the highest speed gear in the position of the shift lever is controlled to remain constant, which makes it impossible to finely change the setting of the engine speed during, traveling. Specifically, when the accelerator is depressed to cause the engine speed to exceed a specified engine speed, the gear shifts to a higher gear, and thereby the engine speed matches the reference engine speed in the gear, which causes a substantial increase in speed. Fourthly, the manipulation of the retarder lever shifts the gear to a lower gear, but the control is not performed until the engine speed reaches the reference engine speed in the maximum speed gear in the position of the shift lever, and therefore the brake control is not performed even the gear is shifted to a lower gear. Incidentally, if a brake, a foot brake pedal, a parking brake are operated other than the retarder lever, the result is the same.

The automatic retarder controller in the second example has a vehicle speed detector, and automatically controls the retarder so that the vehicle speed from the vehicle speed detector matches the reference vehicle speed previously stored, irrespective of the manipulated variable of the retarder lever.

As for the above controller in the second example, the operator previously inputs a reference speed corresponding to the optimum maximum speed Vmax in accordance with a loading weight, the gradient and the distance of a downhill road, and the like, and the automatic retarder controller controls the vehicle speed to remain constant based on the above vehicle speed. Accordingly, if a plurality of downhill roads exist in a course, it is necessary to input reference vehicle speeds respectively for the downhill roads one by one, thus causing the disadvantage of requiring much time and effort.

The automatic retarder controller in the third example has a retarder oil temperature detector, and decreases an oil pressure to prevent continuous overheating when the retarder oil temperature obtained from the retarder oil temperature detector reaches the overheating temperature previously stored, irrespective of the manipulated variable of the retarder lever.

The above third example has the disadvantage of reducing the braking force due to the decreased oil pressure, which increases the vehicle speed.

DISCLOSURE OF THE INVENTION

In view of the disadvantages of the prior art, an object of the present invention is to provide an automatic retarder controller capable of preventing overheating, and more precisely controlling a vehicle speed to remain constant.

Explaining with reference to, for example, FIG. 1 to FIG. 5, a first aspect of an automatic retarder controller according to the present invention is an automatic retarder controller which is mounted on a load-carrying vehicle together with a cooled retarder 31 for exerting a braking force in response to a driving signal A, and which automatically controls the driving signal A so that a slope descending vehicle speed V remains nearly constant (V=Vs), and is characterized by including a first means 22 for detecting a loading weight P of the vehicle, and characterized in that while controlling the vehicle speed to remain constant, the controller 10 impresses a gain G corresponding to the detected loading weight on the driving signal A.

According to the first configuration, the following operational effects are produced. In the prior art, the gain G is fixed either in the manual control or the automatic control. Taking the manual control as an example, the driving signal A only varies according to the manipulated variable of the retarder lever irrespective of the loading weight P. In this situation, however, as the loading weight P becomes heavier, the responsiveness in the control of the vehicle speed to remain constant by the retarder 31 decreases more. That is to say, under the different loading weight P, even when the same vehicle speed V is to be obtained, the braking force differs, and therefore the manipulated variable of the retarder lever must be changed properly, thus reducing the responsiveness as well as causing inconvenience. This can be also said for the control of the vehicle speed to remain constant by means of the conventional automatic retarder controller, which is well known to the operators.

On the other hand, in the first configuration, the gain G is applied upon the driving, signal A according to the loading, weight P (specifically the gain G differs under each loading weight P), thereby outputting, a driving signal GA. For example, as the loading weight P becomes heavier, the gain G is increased more. Explaining this in a manipulation example of the retarder lever, even with the same manipulated variable of the retarder lever, a larger braking force is obtained under the heavier loading weight P. In other words, irrespective of the loading weight P, the effect of obtaining the same responsiveness with the same manipulated variable of the retarder lever, is produced. The first configuration includes the aforementioned effect. Namely, the vehicle speed is controlled to remain constant by means of the retarder 31 based on the responsiveness in accordance with the loading weight P. Incidentally, the value of the extent to which the gain G is made to differ for each loading weight P should be properly set according to types of the vehicle and specifications of the retarder 31. Each of the gains G is previously stored in the automatic retarder controller 10, but a plurality of the gains G may be provided stepwise for each of the loading weight P, or they may be provided as a function ($G=f(P)$) of the loading weight P without levels. Specifically, according to the first configuration, the driving signal GA upon which the gain G is applied is automatically generated, therefore achieving a fine control of the vehicle speed to remain constant. It should be noted that in the first configuration, it is included that the gain G is decreased as the loading, weight P becomes heavier. This is applied when such a situation is set, for example, temporally and made available in the performance check or the like of the automatic retarder controller 10.

A second aspect of the present invention is an automatic retarder controller which is mounted on a load-carrying vehicle together with a cooled retarder 31 for exerting a braking force in response to a driving signal A, and which automatically controls the driving signal A so that a slope descending vehicle speed V remains nearly constant, and is characterized by including a first means 22 for detecting a loading weight P of the vehicle, and characterized in that the controller 10 previously stores gains GL and GS corresponding to a laden state and an unladen state of the vehicle, determines whether the vehicle is in the laden state or the unladen state based on the detected loading weight P, and impresses the gain GL or GS corresponding to the determined state on the driving signal A, while controlling the vehicle speed to remain constant.

The above second configuration is an example of the first configuration, and produces the following particular effects. In the retarders 31 provided at, for example, the wheels, whether they are provided at all the wheels, or at either the front wheel or the rear wheel, a braking force required of each retarder 31 is varied according to the gradient of a downhill road. In this situation, it is necessary to always amend the loading weight P for every gradient in the first configuration. However, in the second configuration, the loading weight P is previously classified into a laden and unladen state, and division can be made to such an extent that an influence is not exerted by the gradient, thus eliminating the need for the aforementioned amendment on every occasion. Specifically, compared with the first configuration, the second configuration is extremely simple and practical. For example, the conventional automatic retarder controller also has a computation unit and a memory unit, and the second configuration can be configured without upgrading these units, or by slightly upgrading them, thus simplifying the control of the components. If the laden state is set as the gain GL, and the unladen state is set as the gain GS with "GL>GS", the vehicle speed can be controlled to remain constant without influence of the loading weight P (specifically, with the excellent responsiveness). This is the same as the effect of the first configuration. Naturally, the other effects of the first configuration are also produced in the second configuration.

A third aspect is characterized by including a second means 24 for detecting a cooling oil temperature T of the retarder 31, and is characterized in that while controlling the vehicle speed to remain constant, the controller 10 estimates an estimated oil temperature Tp after a first reference period of time ts1 based on the detected cooling oil temperature T, increases the driving signal GA on which the gain G is impressed when the estimated oil temperature Tp exceeds a heat balance critical temperature To, and decreases the driving signal GA on which the gain G is impressed when the estimated oil temperature Tp is not higher than the heat balance critical temperature To.

According to the above third configuration, the following effects are produced. Conventionally, in the oil cooled type, for example, when the cooling oil temperature T exceeds the heat balance critical temperature To, the driving signal A is reduced (specifically, a braking force is decreased), and the reduction of the cooling oil temperature T is awaited. In this situation, as described above, there arises the disadvantage of the vehicle speed V increasing, which is not preferable. On the other hand, in the third configuration, when the estimated oil temperature Tp after the first reference period of time ts1 exceeds the heat balance critical temperature To, the driving signal GA is increased to increase the braking force. In this situation, the moment the braking force is increased, the temperature rises, but as is clear when this is regarded as abrupt braking, the rise in the temperature is extremely small, and the rise in the temperature is absorbed within the first reference period of time ts1. Consequently, the actual oil temperature T may he the heat balance critical temperature To, but does not reach an overheating temperature which is higher. Naturally, in order to establish the above situation, the first reference period of time ts1 is previously set according to types of the vehicle and models of the retarder 31. In the third configuration, in order to increase a braking force, the slope descending vehicle speed Vs in the control of the vehicle speed to remain constant so far is decreased, thus securing safety in traveling. On the other hand, when the estimated oil temperature Tp is not more than the heat balance critical temperature To, there is an adequate margin in terms of heat balance, therefore reducing the driving signal GA to decrease the braking force. In this situation, the slope descending vehicle speed Vs so far is increased, but the situation can be regarded as the step for selection of the optimum vehicle speed (the above maximum vehicle speed Vmax) for maintaining heat balance, thus causing no troubles in traveling. A change to increase or reduce the driving signal GA is previously stored in the automatic retarder controller 10, and a plurality thereof may be provided stepwise, or it may be provided as a function of the estimated oil temperature Tp with no levels. The change to increase or reduce the driving signal GA may be made for either the driving signal A or a change rate G, or both. Specifically, according to the third configuration, the maximum vehicle speed Vmax enabling to maintain heat balance can be generated (or itself, and overheating can be prevented.

A fourth aspect is characterized by including a second means 24 for detecting a cooling oil temperature of the retarder 31, and characterized in that while controlling the vehicle speed to remain constant, the controller 10 estimates a period of time taken before the detected cooling oil temperature T reaches or exceeds the heat balance critical temperature To, increases the driving signal GA on which the gain G is impressed when the estimated period of time is less than a second reference period of time ts2, and decreases the driving signal GA on which the gain G is impressed when the estimated period of time is not less than the second reference period of time ts2.

In the above fourth configuration, "the estimated oil temperature Tp" in the third configuration is replaced with "the estimated period of time". Consequently, the fourth configuration has basically the same operational effects as the third configuration.

A fifth configuration is an automatic retarder controller which is mounted on a load-carrying vehicle together with a cooled retarder 31, and which automatically controls a braking force of the retarder 31 so that a slope descending vehicle speed V remains nearly constant (V=Vs), and characterized in that the controller 10 previously stores the slope descending vehicle speed Vs as a plurality of stepwise setting vehicle speeds VFn.m, and allows the slope descending vehicle speed Vs to be selected from the plurality of setting vehicle speeds VFn.m.

According to the above fifth configuration, the following effects are produced. As described above, in the prior art, the operators know the maximum speed Vmax corresponding to the loading weight, and the gradient, the distance, and the like of a downhill road, inputs the maximum speed Vmax into the automatic retarder controller as the reference vehicle speed, and the controller 10 controls the vehicle speed to remain constant so that the actual vehicle speed becomes the aforementioned reference vehicle speed. On the other hand, in the fifth configuration, a plurality of the slope descending vehicle speeds Vs to be controlled to remain constant are previously stored, and the slope descending vehicle speed Vs to be used can be selected from the above setting vehicle speeds VFn.m. Consequently, the vehicle speed can be controlled to remain constant in a wide range with a high degree of flexibility without bothering the operators. Further, since the vehicle speeds VFn.m are provided stepwise, when the slope descending vehicle speed Vs to be controlled to remain constant is changed, a shock occurring in the change can be eliminated. Specifically, according to the fifth configuration, the vehicle speed can be controlled to remain constant with extreme precision and a high degree of flexibility.

Regarding the symbol "VFn.m" in the vehicle speed VFn.m, "n" represents a forward gear number (for example, in F1 to F7, 1 to 7) of a transmission, while "m" represents a division number in each of the forward gears F1 to F7. Examples are as follows. Generally, as the number of gears increases, the travelable vehicle speed range with each gear increases. Accordingly, if the speed range is equally divided by 3 km/h range units, for example, the first speed F1 is divided into around three (m=1 to 3), while the seventh speed 7f is, for example, divided into around six (m=1 to 6). In the medium speed gears F2 to F6, "m" gradually increases from 3 to 6 or 7 in sequence for division.

A sixth configuration is characterized by including a third means 25 for detecting an accelerator pedal depressing signal Ac, fourth means 26 and 27 for detecting braking signals Rb and Sb during the manipulation of the retarder 31 and other brakes 33, a fifth means 52 for outputting a set signal Set inputted from the outside, and a sixth means 21 for detecting the vehicle speed V, and characterized in that while controlling the vehicle speed to remain constant, the controller 10 intermits the control of the vehicle speed to remain constant to allow the vehicle speed V to increase when the detected depressing signal Ac is inputted, and intermits the control of the vehicle speed to remain constant to allow the vehicle speed to decrease when the detected braking signals Rb, and Sb are inputted, and extracts the vehicle speed closest to the detected vehicle speed V from the plurality of setting vehicle speeds VFn.m when the set signal Set is inputted during, the intermissions, and restarts the control of the vehicle speed to remain constant with the extracted vehicle speed being set as the new slope descending vehicle speed Vs.

According to the above sixth configuration, the following effects are produced. In the sixth configuration, while the vehicle speed is controlled to remain constant (for example, Vs=68 km/h=VH7.2), if the accelerator pedal is depressed to an extent more than the present slope descending vehicle speed Vs is secured, the vehicle speed increases (for example, V=70 km/h), and on the other hand, if a retarder brake lever, a foot brake lever, a parking brake lever, and the like are manipulated, the vehicle speed decreases (for example, V=63 km/h). Thus, while the vehicle speed is controlled to remain constant, if the present slope descending vehicle speed Vs is changed by manipulating the accelerator pedal, the retarder brake lever, the foot brake lever, the parking brake lever, and the like, if, for example, at the vehicle speed V (70 km/h, 63 km/h), the press-button-type fifth means 52 is pressed in, the slope descending vehicle speed V (=Vs=68 km/h=VH7.2) which is controlled to remain constant so far is changed to the vehicle speed VFn.m (if F=70 km/h, changed to Vs=71 km/h=VF7.3, and if V=63 km/h, to Vs=62 km/h=VF6.5) which is the closest to the vehicle speed V (70 km/h, 63 km/h) at the time of pressing in the fifth means 52. Namely, the slope descending vehicle speed Vs to be controlled to remain constant is freely renewed. Specifically, according to the sixth configuration, the vehicle speed can be precisely controlled to remain constant.

A seventh configuration is an automatic retarder controller which is mounted on a load-carrying vehicle together with a cooled retarder 31, and which automatically controls a braking force of the retarder 31 so that a slope descending vehicle speed V remains nearly constant (V=Vs), and is characterized by including a third means 25 for detecting an accelerator pedal depressing signal Ac, fourth means 26 and 27 for detecting braking signals Rb and Sb during the manipulation of the retarder 31 and the other brakes 33, a fifth means 52 for outputting a set signal Set inputted from the outside, and a sixth means 21 for detecting the vehicle speed V, and characterized in that while controlling the vehicle speed to remain constant, the controller 10 intermits the control of the vehicle speed to remain constant to allow the vehicle speed to increase when the detected depressing signal Ac is inputted, and intermits the control of the vehicle speed to remain constant to allow the vehicle speed to decrease when the detected braking signals Rb and Sb are inputted, and restarts the control of the vehicle speed to remain constant with the detected vehicle speed V being set as the new slope descending vehicle speed Vs when the set signal Set is inputted during the intermissions.

According to the above seventh configuration, unlike the sixth configuration, the following effects are produced. In the sixth configuration, the vehicle speed is renewed between the slope descending vehicle speeds VFn.m previously stored, but in the seventh configuration, the vehicle speed V after being changed is set as the slope descending vehicle speed Vs as it is. Specifically, in the sixth configuration, the slope descending vehicle speed Vs is changed in levels, but in the seventh configuration it is changed regardless of levels.

An eighth configuration is characterized by including a seventh means 53 for outputting an up-down signal Up/Down inputted from the outside, and characterized in that while controlling the vehicle speed to remain constant, the controller 10 extracts a vehicle speed in a higher speed side than the present slope descending vehicle speed Vs by one level from the plurality of setting vehicle speeds VFn.m to set the same as a new slope descending vehicle speed every time an up signal Up is inputted from the seventh means 53, and extracts a vehicle speed in a lower speed side than the present slope descending vehicle speed Vs by one level from the plurality of setting vehicle speeds VFn.m to set the same as a new slope descending vehicle speed every time a down signal Down is inputted from the seventh means 53.

According to the above eighth configuration, the following effects are produced. The eighth configuration produces the similar effects to those of the sixth configuration. Specifically, the third means 25, the fourth means 26 and 27, the fifth means 52, the sixth means 21 in the fifth configuration are replaced with the seventh means 53 in the eighth configuration. Specifically, in the eighth configuration, while controlling the vehicle speed to remain constant (for example, Vs=68 km/h =VF7.2), every time the up signal Up is received from the seventh means 53, the vehicle speed is renewed to be the vehicle speed VFn.m (=Vs) in the higher speed side by one level (in concrete, from VF7.2 to VF7.3, from VF7.3 to VF7.4, from VF7.5 to . . . ). On the other hand, every time the down signal Down is received, the vehicle speed is renewed to be the vehicle speed VFn.m (=Vs) in the lower speed side by one level (in concrete, from VF7.2 to VF7.1, from VF7.1 to VF6.6, from VF6.6 to VF5.5, . . . ). Naturally, if three down signals Down are received after, for example, two up signals Up are received, the vehicle speed is renewed from VF7.2 to VF7.3, then from VF7.3 to VF7.4, then from VF7.4 to VF7.3, then from VF7.3. to VF7.2, and from VF7.2 to VF7.1 to be the slope descending vehicle speed Vs of "Vs=VF7.1", and the control of the vehicle speed to remain constant is performed based on the slope descending vehicle speed (VF7.1=Vs= V). The manual type renewal of the slope descending vehicle speed Vs has the advantage of free setting in view of the traveling road condition, heat balance maintenance, or the like. Specifically, according to the above configuration, the vehicle speed is precisely controlled to remain constant.

A ninth configuration is an automatic retarder controller which is mounted on a load-carrying vehicle together with a cooled retarder 31, and which automatically controls a braking force of the retarder 31 so that a slope descending vehicle speed V remains nearly constant (V=Vs), and is characterized by including a seventh means 53 for outputting an up-down signal Up/Down inputted from the outside, and characterized in that while controlling the vehicle speed to remain constant, the controller 10 increases the present slope descending vehicle speed Vs by a predetermined vehicle speed range ΔV every time an up signal Up is inputted from the seventh means 53, and decreases the present slope descending vehicle speed Vs by the predetermined vehicle speed range ΔV every time a down signal Down is inputted from the seventh means 53.

According to the above ninth configuration, the following effects are produced. In the ninth configuration, the stepwise renewal of the slope descending vehicle speed Vs is made as in the eighth configuration, but configurationally the following difference exists. While in the eighth configuration a plurality of speeds VFn.m are previously stored, in the ninth configuration the predetermined vehicle speed range ΔV is stored. They are essentially the same, and either one may be adopted.

A tenth configuration is characterized by including a second means 24 for detecting a cooling oil temperature T of the retarder 31, and characterized in that while controlling the vehicle speed to remain constant, the controller 10 estimates an estimated oil temperature Tp after a first reference period of time ts1 based on the detected cooling oil temperature T, extracts a vehicle speed in a lower speed side than the present slope descending vehicle speed Vs from the plurality of setting vehicle speeds VFn.m to set the same as a new slope descending vehicle speed when the estimated oil temperature Tp exceeds a heat balance critical temperature To, and extracts a vehicle speed in a higher speed side than the present slope descending vehicle speed Vs from the plurality of setting vehicle speeds VFn.m to set the same as a new slope descending vehicle speed when the estimated oil temperature Tp is not more than the heat balance critical temperature To.

According to the above tenth configuration, the following effects are produced. The tenth configuration is made in conformance with the above third automatic retarder controller 10. Specifically, "increasing the driving signal GA on which the gain G is impressed" in the third configuration is replaced with "extracting a vehicle speed in a lower speed side than the present slope descending vehicle speed Vs from the plurality of setting vehicle speeds VFn.m to set the same as a new slope descending vehicle speed" in the tenth configuration. In either configuration, the slope descending vehicle speed Vs to be controlled to remain constant is renewed to the decreasing speed side. Further, "decreasing the driving signal GA" in the third configuration is replaced with "extracting a vehicle speed in a higher speed side than the present slope descending vehicle speed Vs from the plurality of setting vehicle speeds VFn.m to set the same as a new slope descending vehicle speed" in the tenth configuration. In either configuration, the slope descending vehicle speed Vs to be controlled to remain constant is renewed to the increasing speed side. Accordingly, in the tenth configuration as in the third configuration, the heat balance is not lost, and the vehicle speed necessarily converges to the slope descending vehicle speed Vs at which the cooling temperature T is equal to the heat balance critical temperature To. Consequently, the vehicle speed is controlled to remain constant with higher efficiency.

An eleventh configuration is characterized by including a second means 24 for detecting a cooling oil temperature T of the retarder 31, and characterized in that while controlling the vehicle speed to remain constant, the controller 10 estimates an estimated oil temperature Tp after a first reference period of time ts1 based on the detected cooling oil temperature T1 to T3, decreases the present slope descending vehicle speed Vs to a lower speed side by a predetermined vehicle speed range ΔV when the estimated oil temperature Tp exceeds the heat balance critical temperature To, and increases the present slope descending vehicle speed to a higher speed side by the predetermined vehicle speed range ΔV when the estimated oil temperature Tp is not higher than the heat balance critical temperature To.

According to the above eleventh configuration, the following effects are produced. While in the tenth configuration the renewal is made according to the plurality of VFn.m, in the eleventh configuration the renewal is made by the predetermined vehicle speed range ΔV, which is the difference between both the configurations. Both of the configurations produce the similar operational effects.

A twelfth configuration is characterized by including a second means 24 for detecting a cooling oil temperature T of the retarder 31, and characterized in that while controlling the vehicle speed to remain constant, the controller 10 estimates a period of time (t4–t3) taken before the detected cooling oil temperature T reaches or exceeds the heat balance critical temperature To, extracts a vehicle speed in a lower speed side than the present slope descending vehicle speed Vs from the plurality of setting vehicle speeds VFn.m to set the same as a new slope descending vehicle speed when the estimated period of time is less than a second reference period of time ts2, and extracts a vehicle speed in a higher speed side than the present slope descending vehicle speed Vs from the plurality of setting vehicle speeds VFn.m to set the same as a new slope descending vehicle speed when the estimated period of time (t4–t3) is not less than the second reference period of time ts2.

According to the above twelfth configuration, the following effects are produced. The twelfth configuration is made in conformance with the above fourth automatic retarder controller 10. Specifically, "increasing the driving signal GA on which the gain G is impressed" in the fourth configuration is replaced with "extracting a vehicle speed in a lower speed side than the present slope descending vehicle speed Vs from the plurality of setting vehicle speeds VFn.m to set the same as a new slope descending vehicle speed" in the twelfth configuration. In either configuration, the slope descending vehicle speed Vs to be controlled to remain constant is renewed to the decreasing speed side. Further, "decreasing the driving signal GA" in the fourth configuration is replaced with "extracting a vehicle speed in a higher speed side than the present slope descending vehicle speed Vs from the plurality of setting vehicle speeds VFn.m to set the same as a new slope descending vehicle speed" in the twelfth configuration. In either configuration, the slope descending vehicle speed Vs to be controlled to remain constant is renewed to the increasing speed side. Consequently, both the twelfth and the fourth configuration have the effect that the heat balance is not lost. Specifically, they have the same relationship as that of the above "tenth configuration and the third configuration", and have almost the same operational effect. The difference between the twelfth and the tenth configuration is that "the estimated oil temperature Tp" in the tenth configuration is replaced with "the estimated time" in the twelfth configuration as in the difference between the fourth and the third configuration.

A thirteenth configuration is characterized by including a second means 24 for detecting a cooling oil temperature T of the retarder 31, and characterized in that while controlling the vehicle speed to remain constant, the controller 10 estimates a period of time (t4–t3) taken before the detected cooling oil temperature T reaches or exceeds the heat balance critical temperature To, decreases the present slope descending vehicle speed Vs to a lower speed side by a predetermined vehicle speed range ΔV when the estimated period of time is less than a second reference period of time ts2, and increases the present slope descending vehicle speed Vs to a higher speed side by the predetermined vehicle speed ranged ΔV when the estimated period of time is not less than the second reference period of time ts2.

According to the above thirteenth configuration, the following effects are produced. While in the twelfth configuration the renewal is made from the plurality of vehicle speeds VFn.m, in the thirteenth configuration the renewal is made by the predetermined vehicle speed range ΔV, which is the difference between both the configurations. However, both the configurations produce the similar operational effects.

A fourteenth configuration is characterized by including an eighth means 40 for informing an outside source of the present slope descending vehicle speed Vs.

According to the above fourteenth configuration, the following effects are produced. In the above automatic retarder controller 10, the slope descending vehicle speed Vs to remain constant is freely or automatically changeable, while the vehicle speed is controlled to remain constant. Consequently, the eighth means 40 is provided so that the operator can recognize the renewed vehicle speed (specifically, the present slope descending vehicle speed Vs and the actual vehicle speed V). As the eighth means 40, for example, a visual display 41, an alarm 42, a lamp 43, a recorder, and the like are prepared.

BRIEF DESCRIPTION OF THE DRAWINGS

FIG. 3 is a flowchart of the start of the control;

FIG. 4 is a flow following that in FIG. 3, and is a flowchart of gain setting; and FIG. 5 is a flow following that in FIG. 4, and is a flowchart of a control of a vehicle speed to remain constant and of a control of the vehicle speed to change.

BEST MODE FOR CARRYING OUT THE INVENTION

Figure 1:
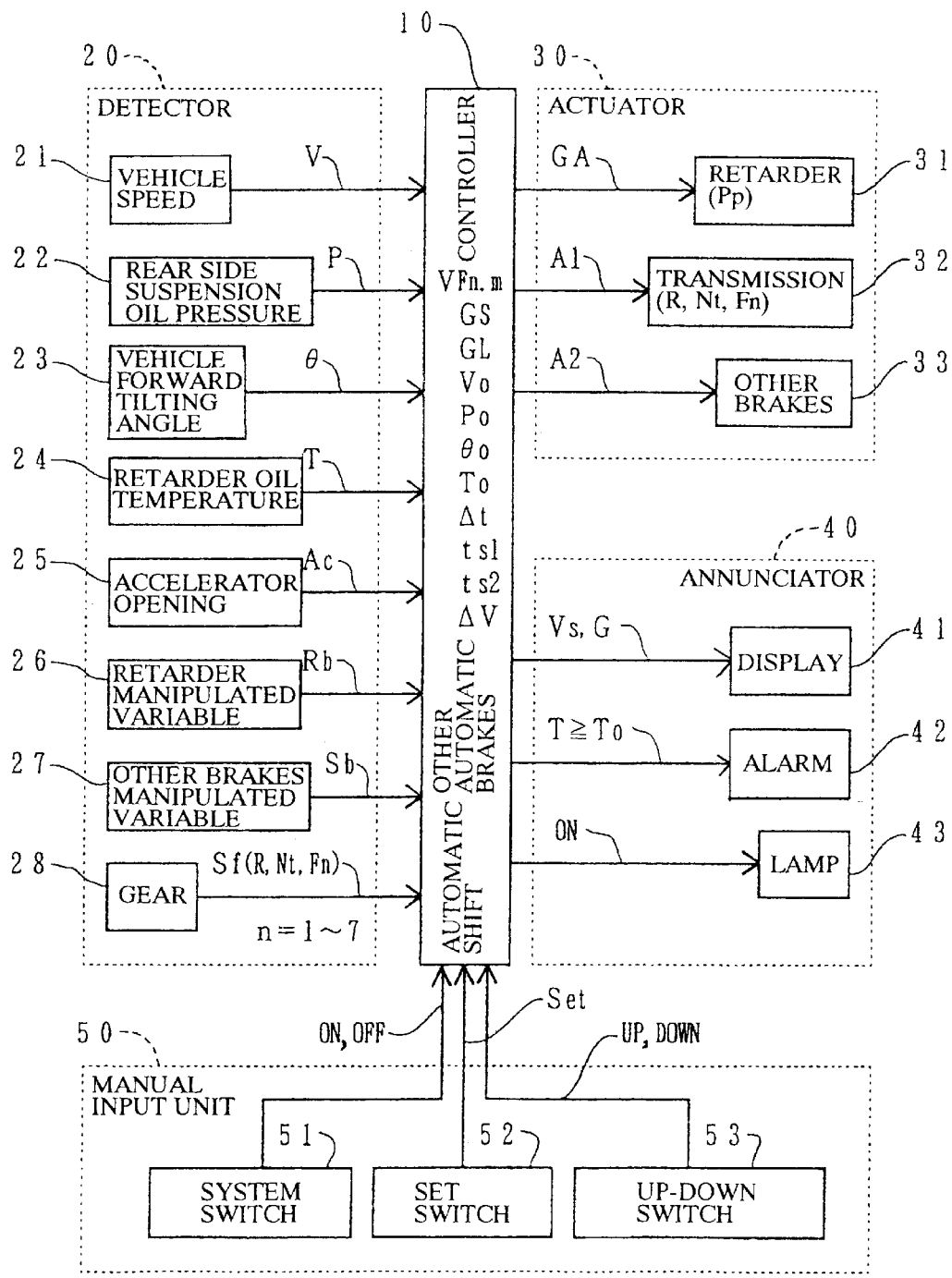
FIG. 1 is a block diagram of an automatic retarder controlling according to an embodiment of the present invention.

An example machine of the present invention is a mine dump track (not illustrated) having, at left and right rear wheels, oil-cooled multiple disc type retarders which exert a braking force according, to oil pressure Pp (Refer to the description in Background Art) corresponding to a retarder lever manipulated variably during a manual control while being cooled with cooling oil. FIG. 1 is a block diagram of an automatic retarder controller 10 (hereinafter simply referred to as "the controller 10") for automatically controlling a retarder 31 after being switched to an automatic control from a manual control by means of a system switch 51.

To the controller 10, connected are a detector 20, an actuator 30, an annunciator 40, and a manual input unit 50.

The detector 20 consists of a vehicle speed detector 21 for detecting a vehicle speed V, a rear wheel side suspension oil pressure detector 22 for detecting an inner pressure P (hereinafter referred to as "the suspension oil pressure P") of a rear wheel side suspension cylinder (not illustrated), a vehicle forward tilting angle detector 23 for detecting a vehicle forward tilting angle θ, a retarder oil temperature detector 24 for detecting a cooling oil temperature T of the retarder 31, an accelerator opening detector 25 for detecting an accelerator opening Ac, a retarder manipulated variable detector 26 for detecting a retarder lever manipulated variable Rb of the retarder lever (not illustrated) provided at a driver seat, an other brakes manipulated variable detector 27 for detecting an other brakes manipulated variable Sb in other brakes 33 such as a foot brake and a parking brake which are operated according to the other brakes manipulated variable Sb of a foot brake pedal (not illustrated) and a parking brake lever (not illustrated) provided at the driver scat, a gear detector 28 for detecting a gear Sf (R, Nt, Fn) at present in a transmission 32 having a reverse R, a neutral Nt, and forward seven speeds Fn (F1 to F7), and the like.

The transmission 32 has the reverse R, the neutral Nt, and the forward seven speed gears Fn (F1 to F7) as described above, but a gear shift lever thereof (not illustrated though provided at the driver seat) has only five positions of a reverse position R, a neutral position Nt, and forward positions P1, P2, and P3. Specifically, the controller 10 receives gear position signals R, Nt, P1, P2, and P3 from the gear shift lever, and the vehicle speed V from the vehicle speed detector 21. On receiving the above information, the controller 10 supplies the transmission 32 with a gear shifting command current A1 to allow the transmission 32 to automatically shift the gear from F2 through F7 in response to the vehicle speed V when the gear shift lever is in the forward position P1, to allow the transmission 32 to shift the gear from F1 through F5 in response to the vehicle speed V when the gear shift lever is in the forward position P2, and to allow the transmission 32 to shift the gear from F1 through F3 in response to the vehicle speed V when the gear shift lever is in the forward position P3. In other words, the transmission 32 serves as an automatic transmission controller together with the controller 10 and the vehicle speed detector 21.

The above detected values V, P, θ, T, Ac, Rb, Sb, and Sf are detected in the respective detectors 21 to 28 and inputted into the controller 10. The suspension oil pressure P from the rear wheel side suspension oil pressure detector 22 is detected as a substitute value of a loading weight, and the rear wheel side suspension oil pressure detector 22 and the controller 10, which performs a computation so that the suspension oil pressure P is assumed to be a loading weight, compose first means. The controller 10 performs an automatic transmission control for the transmission 32 as described above, therefore the gear Sf is inside information of the controller 10. Consequently, the gear detector 28 in the present embodiment is the controller 10 itself. Specifically, FIG. 1 shows each detector of the detector 20 separated from the controller 10 for convenience of explanation, but regardless of FIG. 1, the detector 20 may be separated from the controller 10, may be combined with the controller 10, or may be the controller 10 itself.

The actuator 30 consists of the retarder 31 which exerts a braking force corresponding to the magnitude of a driving current GA on receiving the driving, current GA from the controller 10, the aforementioned transmission 32 for automatically shifting the gear on receiving the gear shifting command current A1 from the controller 10, the aforementioned other brakes 33 which exert a braking force corresponding to the manipulated variable based on the manual manipulation of the foot brake pedal and the parking brake lever, and aside from this, exerts a braking force corresponding lo the magnitude of a driving current A2 on receiving the driving current A2 from the controller 10, and the like.

The other brakes 33 exert a braking force corresponding to the variables based on the depressed variable of the foot brake pedal and the manual manipulation of the parking lever irrespective of the controller 10 in principle as described above. Further, in the present embodiment, the controller 10 controls, for example, an emergency automatic retarder for preventing overrun, an emergency automatic brake, an ABS (Anti-lock Brake-System), ASR (Anti-Spin-Regulation) and the like, as the controller 10 controls the automatic gear shifting of the transmission 32. In order to carry out the automatic control of the above, the controller 10 generates the aforementioned driving current A2, thereby automatically controlling the other brakes 33.

The annunciator 40 consists of a display 41 for visually displaying the set vehicle speed Vs, for example, and the like on receiving them from the controller 10, an alarm 42 for giving an alarm when, for example, the cooling oil temperature T of the retarder 31 overheats, a lamp 43 which illuminates simultaneously with the aforementioned alarm or when an operator turns on a system switch 51 for starting operation, and the like. As is clear from the detailed explanation described below, in the present embodiment itself, an engine of the vehicle or the retarder 31 never overheats, unless a controlling error of the retarder lever by the manual control occurs, or a trouble occurs in a cooling system and the alarm. Specifically, in the present embodiment itself, such an event will never happen as causes the alarm 42 to give an alarm.

The manual input unit 50 is a switch for the operator to manually do input, which consists of the system switch 51 for switching between the manual control (Switch is OFF) by the manipulation of the retarder lever and the automatic control (Switch is ON) according to the present embodiment, a set switch 52 for setting (Set) a vehicle speed (hereinafter referred to as "the set vehicle speed Vs") at which the vehicle speed should be controlled to remain constant, an up-down switch 53 for freely increasing (UP) or decreasing (DOWN) the set vehicle speed Vs, and the like.

The system switch 51 is provided, for example, at the front end of the retarder lever, and when it is pressed once, the automatic retarder control by the controller 10 is switched ON to start operation. When the system switch 51 is pressed once more, the automatic retarder control by the controller 10 is switched OFF to stop operation, thereby switching to the manual control based on the manipulation of the retarder lever. In the present embodiment, when the operator manipulates the retarder lever during, an automatic retarder control, the larger oil pressure Pp works on the retarder 31.

The set switch 52 is a switch used for inputting a signal Set (hereinafter referred to as "the set signal Set")for setting a new desired set vehicle speed Vs when the set vehicle speed Vs is changed to the new desired set vehicle speed Vs irrespective of the vehicle speed V.

The up-down switch 53 is a switch used for inputting an up signal UP or a down signal DOWN to the controller 10 when the set vehicle speed Vs is increased or decreased to be changed to a new desired set vehicle speed Vs, irrespective of the vehicle speed V. In the present embodiment, the up switch and the down switch are separately provided, though they are not illustrated. The up-down switch 53 may be a digital type, or an analog type, and may be a push-button type, a dial type, or the like.

The controller 10 is the automatic retarder controller itself as described above, and previously stores each variable of the following items (a1) to (a9). It should be noted that (a10) is listed here together with the other items, though it is to be used in another embodiment.

(a1) Setting vehicle speed VFn.m (=VF1.1 to VF1.3 to ... to VF7.1 to VF7.6)

The plural number m (=1 to m) of setting vehicle speed is/are provided for each of the gears F1 to F7. The "VFn.m" is the "setting vehicle speed", and is different from the aforementioned "set vehicle speed" of "Vs".

(a2) Gain G

A symbol G in the driving current GA, and the present embodiment has two of large and small gains G (a large gain GL, and a small gain GS).

(a3) Comparison vehicle speed $V_0$

In the present embodiment, "$V_0$ =2 km/h", specifically, "$V_0$=the set vehicle speed Vs±1 km/h".

(a4) Comparison suspension oil pressure $P_0$

In the present embodiment, 70% of the suspension oil pressure P (=full) detected under full load on level ground.

(a5) Comparison forward tilling angle $\theta_0$

In the present embodiment, "$\theta_0$=2°".

(a6) Heat balance critical temperature $T_0$

The maximum cooling temperature T which does not cause the retarder 31 to overheat, and in the present embodiment, "$T_0$=120° C.".

(a7) Extremely short time Δt

In the present embodiment, "Δt=0.5 sec".

(a8) First reference period of time ts1

In the present embodiment, "ts1=5 sec".

(a9) Second reference period of time ts2

In the present embodiment, "ts2=5 sec".

(a10) Predetermined vehicle speed range ΔV

In the present embodiment, "ΔV=3 km/h".

The setting vehicle speed VFn.m (=VF1.1 to VF1.3 to ... to VF7.1 to VF7.6) in the aforementioned (a1) is as follows. In the present embodiment, the entire travelable vehicle speed range which is more than the vehicle speed of 5 km/h is divided into a plurality of ranges at every predetermined vehicle speed range ΔV (=3 km/h), and then set as the setting vehicle speed VFn.m for each of the gears F1 to F7. The concrete explanation is as follows. As the gear speed is faster from F1 to F7, the vehicle speed range becomes larger. For this reason, the setting is as follows. For example, in F1 (n =1), the travelable vehicle speed range is divided into three, that is, VF1.1=5 km/h, VR1.2=8 km/h, and VF1.3=11 km/h (m=1 to 3, VF1.1 to VF1.3). On the other hand, in F7 (n=7), the travelable vehicle speed range is divided into six, that is, VF7.1 =65 km/h, VF7.2=68 km/h, VF7.3=71 km/h, VF7.4= 74 km/h, VF7.5=77 km/h, and VF7.6=80 km/h (m=1 to 6, VF7.1 to VF7.6). In F2 to F6 (n=2 to 6), divisions are made respectively as in the above, in F2 to F4 (n=2 to 4), three divisions are made respectively as in the aforementioned F1 (m=1 to 3, VF2.1 to VF2.3, VF3.1 to VF3.3, VF4.1 to VF4.3), in F5 (n=5), four divisions (m=1 to 4, VF5.1 to VF5.4) are made, and in F6 (n=6), five divisions (m=1 to 5, VF6.1 to VF6.5) are made.

The symbol G for the driving current GA in the aforementioned (a2) is a gain impressed on a driving current A in the prior art, and the present embodiment has two large and small gains G (the large gain GL, the small gain GS) as in the above (a2). Specifically, the oil pressure Pp which works the retarder 31 is regulated by a proportional electromagnetic valve in accordance with the magnitude of the driving current GA flowing into the proportional electromagnetic valve (not illustrated). Here, the driving current A is used in the prior art, and the proportional electromagnetic valve regulates the oil pressure Pp in accordance with the magnitude of the driving current A, but the rate of change of the driving current A cannot be changed if the situation is as it is. Specifically, if the situation is as it is, the rate of change of a braking force, or the rate of change of the vehicle speed V, that is, the responsiveness of the change of the vehicle speed V cannot be changed. The gain G makes it possible to change the above. For example, if the gain G is the large gain GL, the rate of change of the driving current A can be made larger. On the other hand, if it is the small gain GS, the rate of change of the driving current A can be made smaller than that with the aforementioned large gain GL. Specifically, the larger the rate of change of the vehicle speed V is, the quicker the braking responsiveness becomes. In other words, the responsiveness of the constant vehicle speed control becomes quicker. As for the proper use of the large and small gains GL and GS, in the present embodiment, the small gain GS is used when the vehicle is unladen (GA=GS A), and when the vehicle is laden, the large gain GL is used (GA=GL A). It is often experienced that satisfactory responsiveness is obtained in an unladen state while unsatisfactory responsiveness is obtained in a laden state even if the same driving current A is given to the vehicle in both the unladen and laden states. However, if the large and small gains GL and GS are prepared as described above, the responsiveness in the laden state is equalized to that of the unladen state. This is the effect produced by adopting the large and small gains GL and GS in the present embodiment. The determination whether the vehicle is laden or unladen is carried out in the controller 10 with use of the following comparison suspension oil pressure $P_0$.

Specifically, the comparison suspension oil pressure $P_0$ of the aforementioned (a4) is as follows. A maximum vehicle speed Vmax in the vehicle speed control by means of the retarder 31 when the vehicle is laden is totally different from that when the vehicle is unladen. Thus the controller 10 receives the suspension oil pressure P from the rear wheel side suspension oil pressure detector 23, and determines that the vehicle is laden when "$P>P_0$", while the controller 10 determines that the vehicle is unladen when "$P<P_0$".

The difference between the laden and the unladen state does not have to be precise in terms of a loading weight. Specifically, without being affected by the gradient of a downhill road, if the vehicle is laden, such an extent that the vehicle is not determined to be unladen, may be suitable. The concrete explanation is as follows. If the suspension oil pressure P is detected on level ground, the value is allowed to be the substitute value of the loading weight as it is, thereby causing no problem. However, if it is detected while the vehicle is descending a downhill (for example, when the vehicle is loaded with ores and the like from a loader on a downhill road), the vehicle tilts forward, and therefore the suspension oil pressure P shows a smaller value than the actual loading weight. Hence, in the present embodiment, as described in the above (a4), the comparison suspension oil pressure $P_0$ is set to be 70% of the suspension oil pressure P(=full) detected on level ground under full load. In doing so, "$P>P_0$" can be determined to be a laden state up to the vehicle tilting angle θ of about 10° (θ=10°), and is never determined to be an unladen state by mistake. The value of the comparison suspension oil pressure $P_0$ is varied depending on a mounting position of the rear wheel side suspension, or the like, therefore setting an optimum value for each type of vehicle. Further, according to the above explanation, if the vehicle forward tilting angle θ is "θ>10°", the vehicle is determined to be unladen even if it is laden, and in order to avoid this, the controller 10 in the present embodiment amends either the comparison suspension oil pressure $P_0$ or the suspension oil pressure P according to the vehicle forward tilting angle θ detected in the vehicle forward tilting angle detector 23.

The other stored values: the comparison vehicle speed V0(=±1 km/h) in (a3), the comparison forward tilting angle $θ_0$(=2°) in (a5), the heat balance critical temperature $T_0$(= 120° C.) in (a6), the extremely short time Δt(=0.5 sec) in (a7), the first reference period of time ts1(=5 sec) in (a8), the second reference period of time ts2(=5 sec) in (a9), and the predetermined vehicle speed extent ΔV(=3 km/h) are incorporated in the following control example to be explained for convenience of explanation Specifically, the controller 10 automatically controls the retarder, following the steps shown in FIG. 2 to FIG. 5.

Figure 2:
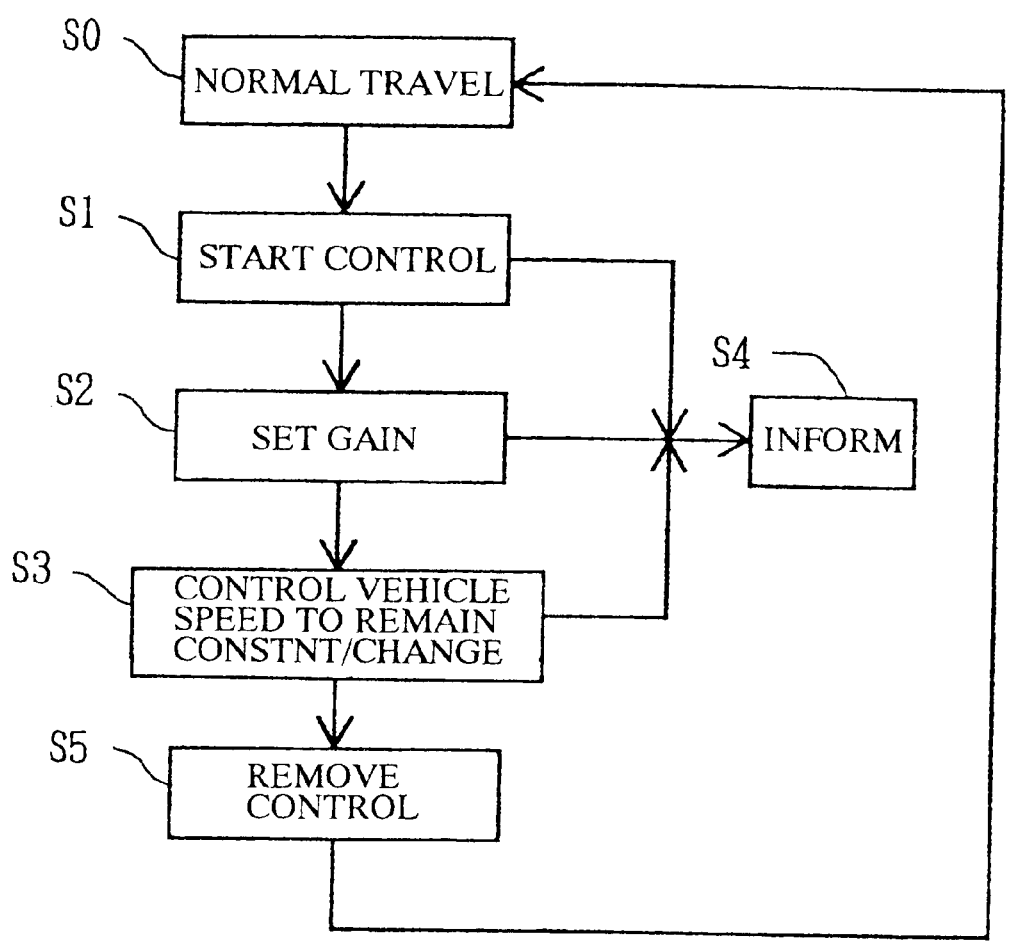
FIG. 2 is a general flowchart of the automatic retarder controller according to the embodiment of the present invention.

FIG. 2 is a general flowchart of an example of an automatic retarder control. Regarding the explanation of the following flow steps, "step S0", for example, is simply expressed as "S0". In normal traveling (S0), the controller 10 performs gain setting (S2) and the controls of the vehicle speed to remain constant/to change (S3) in this order from the start of the control (S1) to the removal of the control (S5), and informs the operator of the actual vehicle speed V, the set vehicle speed Vs, and the like by means of the annunciator 40 (S4). The details are as follows.

The normal traveling (S0) is the conventional traveling form including automatic controls of automatic transmission, an emergency automatic retarder for overrun protection, an emergency automatic brake, an ABS, ASR, and the like by means of the controller 10 other than various kinds of manual controls, as described above. A parking state after starting the engine is naturally included in the normal traveling (S0). In this normal traveling (S0), the start of the automatic retarder control will be explained with reference to FIG. 3.

Figure 3:
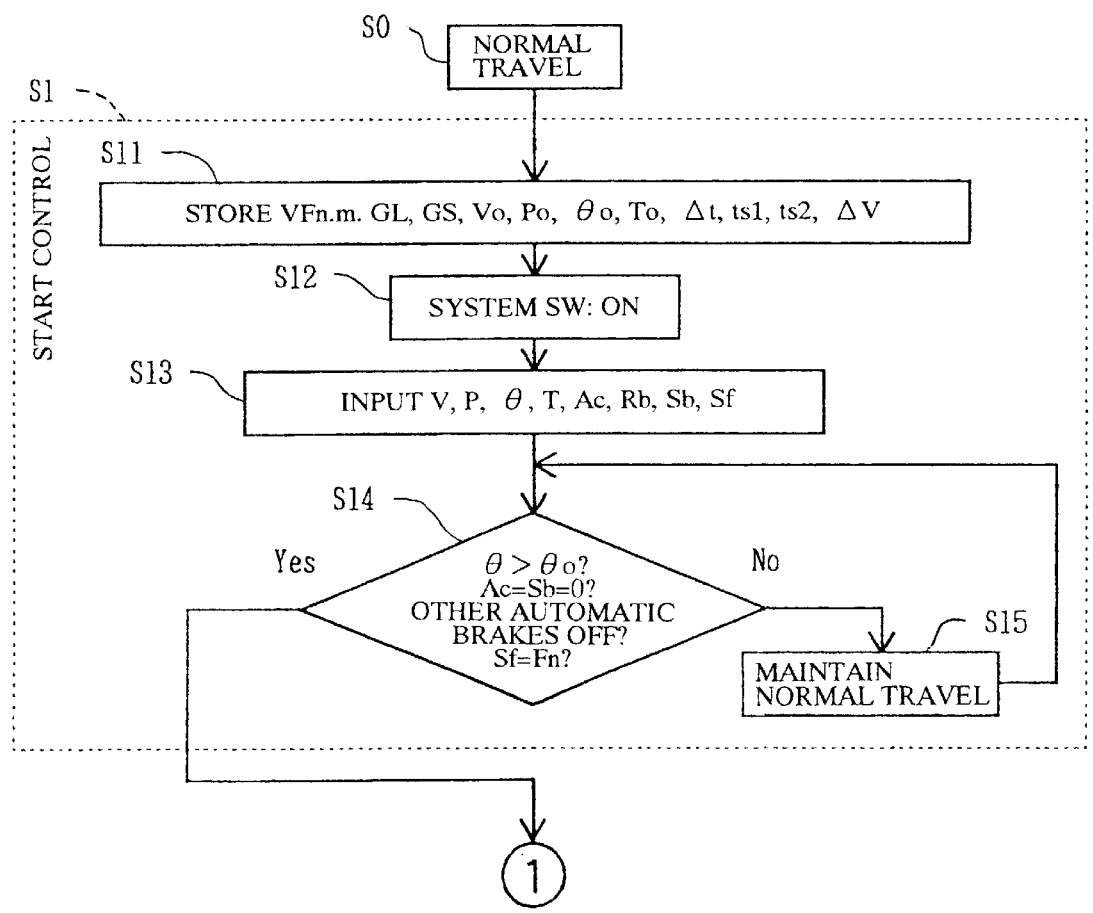
FIG. 3 to FIG. 5 each show a flow of the automatic retarder controller according to the embodiment of the present invention.

As shown in FIG. 3, the start of the automatic retarder control (S1) is made as follows. As described above, the controller 10 previously stores the aforementioned values, VFn.m, GL, GS, $V_0$, $P_0$, $θ_0$, $T_0$, Δt, ts1, ts2, and ΔV (S11). The automatic retarder control starts when the controller 10 receives a signal ON, which is inputted by the operator, from the system switch 51 (S12). As the next step or the previous step to S12, the controller 10 receives the actual vehicle speed V from the vehicle speed detector 21, the suspension oil pressure P from the rear wheel side suspension oil pressure detector 22, the vehicle forward tilting angle θ from the vehicle forward tilting angle detector 23, the cooling oil temperature T from the retarder oil temperature detector 24, the accelerator opening Ac from the accelerator opening detector 25, the retarder lever manipulated variable Rb from the retarder manipulated variable detector 26, the other brakes manipulated variable Sb from the other brakes manipulated variable detector 27, and the gear Sf (R, Nt, Fn) from the gear detector 28 (in the present embodiment, the controller itself as described above) (S13). The controller 10 then determines whether all of the following requirements are satisfied: the requirement "θ>θo (specifically, θ>2°)" as a result of comparing the vehicle forward tilting angle θ with the comparison forward tilting angle θo (Specifically, the requirement that the vehicle enters a downhill road), the requirement that the accelerator opening Ac and the other brakes manipulated variable Sb are respectively zero(=0) (Specifically, the requirement that the accelerator and the other brakes are not operated. That is to say, a coasting state without braking. However, this requirement may be omitted.), the requirement that the controller 10 is not performing an automatic control of the other automatic brakes such as the overrun prevention emergency automatic retarder, the emergency automatic brake, the ABS, the ASR at present (This requirement may be also omitted.), and the requirement that the gear Sf is the forward Fn (S14). It should be noted that, for example, the requirement that the retarder lever manipulated variable Rb is zero(=0), may be added to the aforementioned various requirements, though this is not adopted in the present embodiment. Various kinds of requirements can be prepared other than the above requirements. If all the requirements are not satisfied in the above determination (S14), the state before the system switch 51 is turned ON to start operation, specifically, the normal traveling state (S0) is maintained (S15). On the other hand, if it is determined that all the requirements are satisfied in the above determination (S14), or if all the requirements are satisfied as a result of the operation by the normal traveling operation in S15, the controller 10 performs the next gain setting (S2) shown in FIG. 4.

Figure 4:
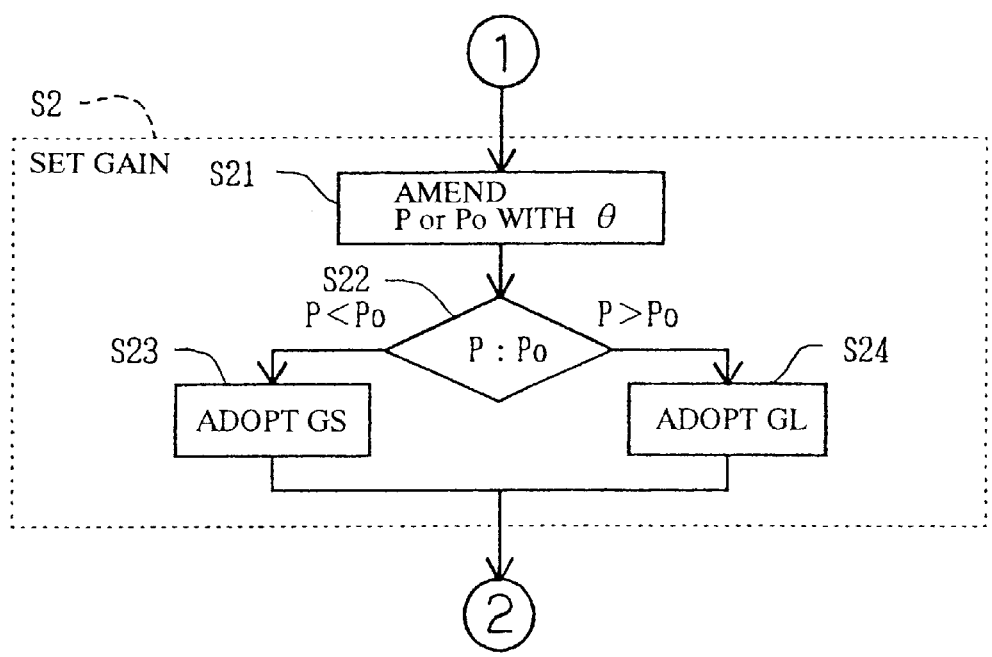

As shown in FIG. 4, the gain setting (S2) is performed as follows. As described above, as for the gain G, if a vehicle is laden, the large gain GL is used, and if the vehicle is unladen, the small gain GS is used. Specifically, the controller 10 compares the comparison suspension oil pressure Po with the suspension oil pressure P (S22). If the comparison result is "P<Po", the controller 10 reads the small gain GS form the memory, and outputs the driving current GA as the driving current GS A (S23). On the other hand, if the comparison result is "P>Po", the controller 10 reads the large gain GL from the memory, and outputs the driving current GA as the driving current GL A (S24). If only the large gain GL and the small gain GS have the relationship that "GL>GS", either one may be "1". The effects of setting the large and small gains GL and GS are as described above.

As described above, the suspension oil pressure P becomes smaller than the actual load weight as the vehicle forward tilting angle θ becomes larger. Consequently the amendment is required. Thus in the aforementioned gain setting (S2), as the previous step to S22, the controller 10 amends either the comparison suspension oil pressure Po or the suspension oil pressure P with the vehicle forward tilting angle θ from the vehicle forward tilting angle detector 23 (S21).

The aforementioned amendment is made, for example, as follows. The controller 10 previously stores an amendment value (either $P_0 1$ or P1) as a function of either Po or P, and the vehicle forward tilting angle θ, and it may be suitable to calculate linearly from either Po or P, and the vehicle forward tilting angle θ. Alternatively, the controller 10 may previously store the amendment value in a matrix with one axis being set as either Po or P and the other axis being set as the vehicle forward tilting angle θ, and may read the amendment value from those stored. As described above, the amendment may be started, for example, from "θ>10° or so", and at "θ>2°", the amendment may be always made. The amendment should be properly adjusted according to the detection precision of the rear wheel side_suspension oil pressure detector 22 and the vehicle forward tilting angle detector 23, and the method for setting the comparison suspension oil pressure $P_0$. After the completion of the setting of the gain G for the driving current GA supplied to the retarder 31 (S2) as described above, the controller 10 controls the vehicle speed to remain constant (S3) as shown in FIG. 4.

Figure 5:
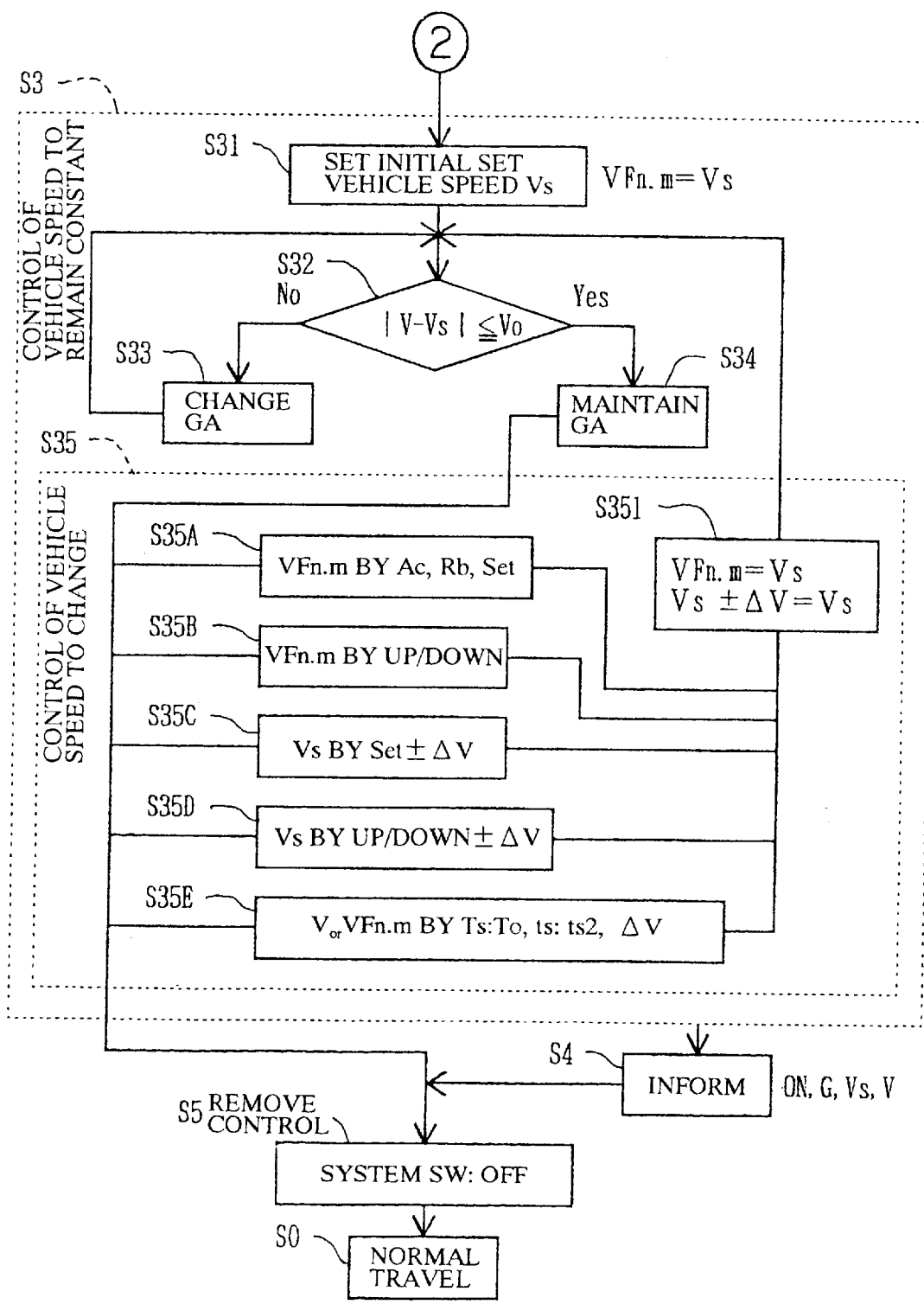

As shown in FIG. 5, the control of the vehicle speed to remain constant (S3) includes the control to change the vehicle speed which is to be constant (S35). First, an initial set vehicle speed Vs, which is initially to be controlled to remain constant, is set. Various methods can be prepared as described in the following examples (b1) and (b2) for the above. It is optional which one is adopted, or which ones are adopted in combination.

(b1) When the system switch 51 is turned ON to start operation, the setting vehicle speed VFn.m which is the closest to the actual vehicle speed V at this time is set as the initial set vehicle speed Vs. In the aforementioned (b1), for example, the situations in the following (b11) to (b13) are included. However, the present embodiment has the various requirements explained in S14, and therefore the situations in (b12) to (b13) are not adopted. However, some of the requirements explained in S14 may be omitted, and if they are omitted, the (b12) to (b13) may be adopted.

(b11) The setting vehicle speed VFn.m closest to the actual vehicle speed V, which is obtained when the system switch 51 is turned ON to start operation while the retarder lever is manipulated, is set as the initial set vehicle speed Vs. In this situation, the manipulated state of the retarder lever can be obtained from the retarder lever manipulated variable Rb from the retarder manipulated variable detector 26, while the actual vehicle speed V is obtained from the vehicle speed detector 21.

(b12) The setting vehicle speed VFn.m closest to the actual vehicle speed V, which is obtained when the system switch 51 is turned ON to start operation while the foot brake pedal, the parking brake lever, and the like of the other brakes 33 are manipulated, is set as the initial set vehicle speed Vs. In this situation, the manipulated state of the retarder lever is obtained from the retarder lever manipulated variable Rb from the retarder manipulated variable detector 26, while the actual vehicle speed V is obtained from the vehicle speed detector 21.

(b13) The setting vehicle speed VFn.m closest to the actual vehicle speed V, which is obtained when the system switch 51 is turned ON for starting operation while the accelerator pedal is depressed, is set as the initial set vehicle speed Vs. In this situation, the manipulated state of the retarder lever is obtained from the retarder lever manipulated variable Rb from the retarder manipulated variable detector 26, while the actual vehicle speed V is obtained from the vehicle speed detector 21.

(b2) The setting vehicle speed VFn.m closest to the actual vehicle speed V when all the determination requirements in S14 are satisfied is set as the initial set vehicle speed Vs.

According to the above (b1) and (b2), the vehicle can travel only with the automatic retarder control all day without the manual control. Specifically, the automatic retarder control can be performed continuously from the time when the operator turns ON the system switch 51 at the start of the operation of the vehicle early in the morning until the time when the operator turns OFF the system switch 51 at the end of the operation of the vehicle in the evening.

The initial set vehicle speed Vs(=VFn.m For example, VF3.3) is set based on either the aforesaid (b11) or (b2), or the combination of them (S31). Subsequently, the controller 10 controls the vehicle speed to remain constant as described below (S32 to S34).

In the present embodiment, in order to reduce the computation load in the controller 10, a little allowable range is provided for the set vehicle speed Vs (=VFn.m). This allowable range is the aforementioned comparison vehicle speed Vo (2 km/h, specifically, ±1 km/h). In the present embodiment, if the absolute value of the difference (V−Vs) between the vehicle speed V and the set vehicle speed VF3.3 (=Vs) does not fall within "1 km/h", the driving current GA is changed so that the absolute value falls therein (S33). Meanwhile, if the absolute value of the difference falls within "1 km/h", the vehicle speed is regarded as constant, and the driving current GA at this time is maintained (S34). In doing so, the consumption of air and oil can be reduced, and the risk of running out of air and oil can be avoided. It should be noted that the driving current GA which is changed in S33 is not the gain G, but the driving current A. Incidentally, when the system switch 51 is turned ON to start operation while the retarder lever is not manipulated [this occurs in (b1) other than the aforesaid (b11), and also in (b2)], the initial driving current GA is zero (GA=0). In this situation, as long as the set vehicle speed Vs is not changed, the driving current GA remains zero (GA=0). On the other hand, when the system switch 51 is turned ON to start operation while the retarder lever is manipulated [this occurs in the aforementioned (b11), and also in (b2)], the driving current GA corresponding to the retarder lever manipulated variable Rb occurs.

During the aforesaid control of the vehicle speed to remain constant (S32 to S34), when the operator changes the set vehicle speed VF3.3 (=Vs) of the early stage, for example, the control in the following S35A to S35E is performed in the present embodiment. Any one of the steps S35A to S35E may be adopted, or they may be adopted in combination. The combination of any one or all of the steps S35A to S35D with the step S35E is preferable.

The step S35A is as follows. When the set vehicle speed Vs (=VF3.3) is desired to change to the increasing speed side, the operator depresses the accelerator pedal to increase the vehicle speed V. Thereby, the controller 10 receives the accelerator opening Ac from the accelerator opening detector 25, and intermits the aforementioned control of the vehicle speed to remain constant while receiving the accelerator opening A. Accordingly, the actual vehicle speed V increases. The set vehicle speed VFn.m (for example, VF 4.2) closest to the actual vehicle speed V at this time becomes the new set vehicle speed Vs. On the other hand, when the set vehicle speed Vs (=VF3.3) is desired to change to the decreasing speed side, the operator manipulates the retarder lever, and the foot brake pedal, the parking lever, and the like of the other brakes 33 to decrease the vehicle speed V. Thereby the controller 10 receives the retarder lever manipulated variable Rb from the retarder manipulated variable detector 26, and also receives the other brakes manipulated variable Sb from the other brakes manipulated variable detector 27. The controller 10 intermits the aforementioned control of the vehicle speed to remain constant while receiving the retarder lever manipulated variable Rb and the other brakes manipulated variable Sb. Consequently, the actual vehicle speed V decreases. When the accelerator opening reaches zero(=0), or when the retarder lever, and the foot brake pedal, the parking lever and the like of the other brakes 33 are OFF, the set vehicle speed VFn.m (for example, VF2.1) closest to the actual vehicle speed V is set as the new set vehicle speed Vs. Incidentally, at this time, the controller 10 receives the vehicle speed V, which is increased or decreased, from the vehicle speed detector 21. When the set vehicle speed Vs is changed, the controller 10 performs the aforementioned control of the vehicle speed to remain constant (S32 to S34) based on the vehicle speed Vs which is changed.

Step S35B is as follows. The operator optionally presses the up-down switch 53, thereby making it possible to change the set vehicle speed Vs(=VFn.m) at will. Specifically, the up-down switch 53 consists of the up switch and the down switch as described above, and every time the up switch is pressed once, the set vehicle speed Vs(=VFn.m) increases by one level. For example, when the set vehicle speed is set to increase from VF3.3 to VF4.2, the up switch is pressed twice. The first press increases the set vehicle speed from VF3.3 to VF4.1, and the second press increases it from VF4.1 to VF4.2. Meanwhile, every time the down switch is pressed once, the set vehicle speed Vs(=VFn.m) decreases by one level. For example, when the set vehicle speed is set to decrease from VF3.3 to VF2.2, the down switch is pressed four times. The first press decreases the set vehicle speed from VF3.3 to VF.3.2, the second press decreases it to VF3.1, the third press to VF2.3, and the fourth press to VF2.2. When the set vehicle speed Vs is changed, the controller 10 performs the aforementioned control of the vehicle speed to remain constant (S32 to S34) based on the set vehicle speed Vs which is changed.

In steps S35C and S35D for changing the set vehicle speed Vs described below, the vehicle speed is changed without requiring the setting vehicle speed VFn.m as in steps S35A and S35B. Specifically, either S35A or S35B, or both of them can be adopted for a certain vehicle. Likewise, either S35C or S35D, or both of them can be adopted for a certain vehicle. When all of S35A to S35D are adopted, it is necessary to additionally provide means for switching at least between S35A and S35B, and between S35C and S35D, for example, a change-over switch.

Step S35C is as follows. When it is desired to change the set vehicle speed Vs to a higher speed side, the operator may press in the set switch 52 while depressing the accelerator pedal to increase the vehicle speed V so that the actual vehicle speed V at this time is set as the new set vehicle speed Vs. On the other hand, when it is desired to decrease the set vehicle speed Vs, the operator may press in the set switch 52 while manipulating the retarder lever, and the foot brake pedal, the parking lever and the like of the other brakes 33 to decrease the vehicle speed V so that the actual vehicle speed V at this time is set as the new set vehicle speed Vs. At this time, the controller 10 receives the actual vehicle speed V which is increased or decreased from the vehicle speed detector 21, and also receives the set signal Set from the set switch 52 thereby processing the pressed state of the set switch 52. When the set vehicle speed Vs is changed, the controller 10 performs the aforementioned control of the vehicle speed to remain constant for the set vehicle speed Vs which is changed (S32 to S34).

Step S35D is as follows. The operator may press the up-down switch 53 optionally, thereby increasing or decreasing the set vehicle speed Vs by the predetermined vehicle speed extent ΔV for every single press. When the set vehicle speed Vs is changed, the controller 10 performs the aforementioned control of the vehicle speed to remain constant for the set vehicle speed Vs which is changed (S32 to S34).

The above controls are performed irrespective of the gradients and the distances of downhill roads. However, as described above, the maximum vehicle speed Vmax by the retarder 31 are greatly limited by not only the loading weight, but also the gradient and the distance of a downhill road. In the present embodiment, as described below, a control to automatically change the set vehicle speed Vs so that the set vehicle speed Vs does not exceed the maximum vehicle speed Vmax based on the cooling oil temperature T of the retarder 31, which is generated according to the gradient and the distance of the downhill road.

Specifically, when the downhill road has a high gradient and a long distance, if the set vehicle speed Vs is not changed, or the changed vehicle speed is improper, the retarder 31 and the engine overheat. Thus, in order to prevent the overheating, the controller 10 estimates the cooling oil temperature T after, for example, 2 sec based on the cooling temperature T from the retarder oil temperature detector 24. Specifically, in step S3SE, for example, the following predictive computation is performed, thereby increasing or decreasing the set vehicle speed Vs to obtain another set vehicle speed Vs.

The rising prediction of the cooling oil temperature T of the retarder 31 can be calculated, for example, as follows. The following number 1 is a primitive equation (a general formula) of the heat balance.

$$Ts = T_o(1 - e^{-kts}) \tag{1}$$

where $T_o$ is the aforementioned heat balance critical temperature(=120° C.), k is a constant, Ts (s=1 to 3) is a sampling temperature after "Δt·s" (Δt=0.5 sec, s=1 to 3) from a certain point of time.

Specifically, T1 is the first sampling temperature after t1 (ts=t1=Δt=0.5 sec) from a certain point of time, T2 is the second sampling temperature after t2 (ts=t2=2×Δt=1 sec) from the aforementioned certain point of time, and T3 is the third sampling temperature after t3 (ts=t3=3×Δt=1.5 sec) from the aforementioned certain point of time. T4 is a temperature T4($\geq$120° C.) which is estimated to be reached after t4 (ts=t4=4×Δt=2 sec) from the aforementioned certain point of time. Each temperature Ts (s=1 to 4) is expressed as the following equations (2) to (5) from the above equation (1).

$$T1 = T_0(1 - e^{-kt1}) \quad (2)$$

$$T2 = T_0(1 - e^{-kt2}) \quad (3)$$

$$T3 = T_0(1 - e^{-kt3}) \quad (4)$$

$$T4 = 120° = T_0(1 - e^{-kt4}) \quad (5)$$

From the simultaneous solution of the above equations (2) to (4), the heat balance critical temperature $T_0$ in the following equation (6) can be obtained.

$$T_0 = (T1^2 - T1 \cdot T3)/(2T2 - T1 - T3) \quad (6)$$

If "$2T2 - T1 - T3 = 0$", sampling is repeated once more. From the simultaneous solution of the equations (4) to (6), the following equation (7) is obtained. The equation (7) is an estimated period of time from the time t3 until the time t4 at which the temperature reaches overheating temperature T4.

$$(t4 - t3) = (-\Delta t \cdot \log A / \log B) \quad (7)$$

A and B in the equation (7) are respectively expressed in the following equations (8) and (9).

$$A = (T2^2 - T1 \cdot T3 - 240 T2 + 120 T1 + 120 T3)/(T3 - T2)^2$$

$$B = (T2 - T1)/(T3 - T2)$$

Specifically, at the stage in which the third sampling is performed, the estimated period of time (t4–t3) taken before the temperature reaches the heat balance critical temperature $T_0(=T4)$ can be calculated. At this time if "(t4–t3)<ts2 5 sec", the set vehicle speed Vs is changed to the lower speed side. On the other hand, if "(t4–t3)$\geq$ts2=5 sec", the set vehicle speed Vs is increased to the higher speed side. Incidentally, when the setting, vehicle speed VFn.m as in the present embodiment is not used, it may be suitable to increase or decrease the set vehicle speed Vs by the predetermined vehicle speed extent ΔV. Changing the set vehicle speed Vs means changing, the driving signal GA, therefore it may be put in another way: the driving signal GA is changed. When the set vehicle speed Vs is changed, the controller 10 performs the aforesaid control of the vehicle speed to remain constant for the changed set vehicle speed Vs (S32 to S34).

At the stage in which the third sampling is performed, the period of time (t4–t3) taken before the temperature reaches the heat balance critical temperature $T_0(=T4)$ can be calculated, which means that it is preferable to change the set vehicle speed Vs to the lower speed side if an estimated oil temperature Tp is "Tp>$T_0$" after the first reference period of time ts1 (5 sec) with t4–t3=ts1. On the other hand, if "Tp $\leq T_0$", it is preferable to increase the set vehicle speed Vs to the higher speed side. In this situation, when the setting vehicle speed VFn.m as in the present embodiment is not used, it may be suitable to increase or decrease the set vehicle speed Vs by the predetermined vehicle speed extent ΔV (3 km/h). As described above, changing the set vehicle speed Vs means changing the driving signal GA, therefore it may be put in another way: the driving signal GA is changed. When the set vehicle speed Vs is changed, the controller 10 performs the aforesaid control of the vehicle speed to remain constant for the changed set vehicle speed Vs (S32 to S34).

The above computation is an example of the tendency calculation of a change with respect to time based on the sampling temperature Ts, therefore if an increased temperature can be estimated, a least squares method and the like may be used.

Specifically, unlike the prior art, in step S35E, the set vehicle speed Vs is automatically changed by being increased and decreased in sequence so that the heat balance can be secured at least after the first and second reference periods of time ts1 and ts2 (both are 5 sec).

Incidentally, in the present embodiment, when the cooling oil temperature T approaches the heat balance critical temperature $T_0$(120° C.), an automatic speed change control to decrease the set vehicle speed Vs itself, or to increase the driving current GA to increase the braking force by the retarder to thereby decrease the vehicle speed V, is carried out. Meanwhile, in the prior art, when the retarder 31 overheats, the automatic speed change control to reduce the driving current A to reduce the braking force by the retarder 31, is carried out. Specifically, in step S35E in the present invention, the braking force is increased once, but this is only for a moment (about 0.5 to 1 sec), therefore this can be regarded as an emergency brake, and the cooling oil temperature T hardly rises. Consequently, when the operator sets the maximum vehicle speed Vmax with the gradient and the distance of a downhill road in mind, and even if the operator doesn't previously set the maximum vehicle speed Vmax as the set vehicle speed Vs(=VFn.m), the set vehicle speed Vs naturally converges to the maximum vehicle speed Vmax, or the setting vehicle speed VFn.m closest to the maximum vehicle speed Vmax. It should be noted that even if the set vehicle speed Vs converges to the maximum vehicle speed Vmax, it is not preferable that the vehicle travels at a higher speed than the operator's recognition. Thus, a prohibitive control may be introduced so that the vehicle speed does not exceeds the set vehicle speed Vs initially set by the operator in (b1) and (b2) in S31, or the set vehicle speed Vs changed in S35A to S35D.

Other embodiments according to the present invention will be itemized and described.

(1) In the above embodiment, the loading weight is divided into a laden and an unladen state, and the gains GL and GS corresponding to the laden and the unladen state are impressed on the driving signal A. On the other hand, in this embodiment, a medium laden state is provided between the laden state and the unladen state, and three levels of large, medium, and small gains GL, GM, GS are provided. Still further fragmentation may be suitable. It is natural that the gain G corresponding to the loading weight may be linearly impressed on the driving signal A (specifically, not divided in levels).

(2) Though in the above embodiment, the controller 10 previously stores the setting vehicle speed VFn.m (VF1.1 to VF1.3 to ... to VF7.1 to VF7.6), and the set vehicle speed Vs is selected from these setting vehicle speed VFn.m, the setting vehicle speed VFn.m may not be stored, and the set vehicle speed Vs may have no levels. In this situation, when the set vehicle speed Vs is changed by means of the set switch 52, the actual vehicle speed V when the set switch 52 is manipulated may be set as the set vehicle speed Vs.

(3) In the above embodiment, the entire vehicle speed range is equally divided at every 3 km/h to thereby provide a plurality of setting vehicle speeds VFn.m (VF1.1 to VF1.3 to . . . to VF7.1 to VF7.6), but depending on vehicles, the heat balance of the retarder 31 cannot be secured unless the engine speed in each gear is not less than the predetermined speed. In such a situation, when, for example, the engine speed with "m=1" in the above embodiment is not more than the predetermined speed, it is preferable not to set VF1.1, VF2.1, VF3.1, VF4.1, VF5.1, VF6.1, and VF7.1.

(4) It is preferable to display the set vehicle speed Vs in the above embodiment with the display 41 so that the operator can recognize it. Naturally, it is preferable to inform the operator of various kinds of detected information and danger information with use of the annunciator 42, the lamp 43, and the like. Further, it is preferable to make it possible to record the set vehicle speed Vs in a recorder or the like. Thereby, the operation of a vehicle, the consumption of tires, and the like can be controlled.

Industrial Availability

The present invention is useful as an automatic retarder controller which prevents overheating, and can more precisely control the vehicle speed to remain constant.

What is claimed is:

1. An automatic retarder controller which is mounted on a load-carrying vehicle together with a cooled retarder, and which automatically controls a braking force of said retarder so that a slope descending vehicle speed remains nearly constant, comprising:

a means for detecting an accelerator pedal depressing signal;

means for detecting braking signals during the manipulation of said retarder and other brakes;

a means for outputting a set signal inputted from the outside; and a means for detecting the vehicle speed, wherein the controller previously stores the slope descending vehicle speed as a plurality of stepwise setting vehicle speeds, and allows the slope descending vehicle speed to be selected from said plurality of setting vehicle speeds, while controlling the vehicle speed to remain constant, when said detected accelerator pedal depressing signal is inputted, said controller intermitting said control of the vehicle speed to remain constant to allow the vehicle speed to increase, and when said detected braking signals are inputted, intermitting said control of the vehicle speed to remain constant to allow the vehicle speed to decrease, and when said set signal is inputted during said intermissions, extracting the vehicle speed closest to said detected vehicle speed from said plurality of setting vehicle speeds, and restarting said control of a vehicle speed to remain constant with said extracted vehicle speed being set as a new slope descending vehicle speed.

2. An automatic retarder controller which is mounted on a load-carrying vehicle together with a cooled retarder, and which automatically controls a braking force of said retarder so that a slope descending vehicle speed remains nearly constant, comprising:

a means for detecting the present vehicle speed; and a means for outputting an up-down signal inputted from the outside, wherein the controller previously stores the slope descending vehicle speed as a plurality of stepwise setting vehicle speeds, and allows the slope descending vehicle speed to be selected from said plurality of setting vehicle speeds, and while controlling the vehicle speed to remain constant, said controller extracting a vehicle speed in a higher speed side than the present slope descending vehicle speed detected by said means for detecting the present vehicle speed by one level from said plurality of setting vehicle speeds to set the same as a new slope descending vehicle speed every time an up signal is inputted from said means for outputting an up-down signal inputted from the outside, and extracting a vehicle speed in a lower speed side than the present slope descending vehicle speed detected by said means for detecting the present vehicle speed by one level from said plurality of setting vehicle speeds to set the same as a new slope descending vehicle speed every time a down signal is inputted from said means for outputting an up-down signal inputted from the outside.

3. The automatic retarder controller in accordance with claim 1 or 2, wherein said controller stores a heat balance critical temperature therein, said controller further comprising:

a means for detecting a cooling oil temperature of said retarder; and a means for detecting the present vehicle speed, while controlling the vehicle speed to remain constant, said controller estimating an estimated oil temperature after a first reference period of time based on said detected cooling oil temperature, when said estimated oil temperature exceeds said heat balance critical temperature, extracting a vehicle speed in a lower speed side than the present slope descending vehicle speed detected by said means for detecting the present vehicle speed from said plurality of setting vehicle speeds to set the same as a new slope descending vehicle speed, and when said estimated oil temperature is not higher than the beat balance critical temperature, extracting a vehicle speed in a higher speed side than the present slope descending vehicle speed detected by said means for detecting the present vehicle speed from said plurality of setting vehicle speeds to set the same as a new slope descending vehicle speed.

4. The automatic retarder controller in accordance with claim 1 or 2, wherein said controller stores a heat balance critical temperature therein, said controller further comprising:

a means for detecting a cooling oil temperature of said retarder; and a means for detecting the present vehicle speed, while controlling the vehicle speed to remain constant, said controller estimating a period of time taken before said detected cooling oil temperature reaches or exceeds the heat balance critical temperature, when said estimated period of time is less than a second reference period of time, extracting a vehicle speed in a lower speed side than the present slope descending vehicle speed detected by said means for detecting the present vehicle speed from said plurality of setting vehicle speeds to set the same as a new slope descending vehicle speed, and when said estimated period of time is not less than the second reference period of time, extracting a vehicle speed in a higher speed side than the present slope descending vehicle speed detected by said means for detecting the present vehicle speed from said plurality of setting vehicle speeds to set the same as a new slope descending vehicle speed.

5. An automatic retarder controller which is mounted on a load-carrying vehicle together with a cooled retarder for exerting a braking force in response to a driving signal, and which automatically controls said driving signal so that a slope descending vehicle speed remains nearly constant, comprising:

a first means for detecting a loading weight of said vehicle; and a second means for detecting a cooling oil temperature of said retarder, while controlling the vehicle speed to remain constant, the controller impressing a gain corresponding to said detected loading weight on said driving signal; and estimating an estimated oil temperature after a first reference period of time based on said detected cooling oil temperature, when said estimated oil temperature exceeds a heat balance critical temperature, increasing the driving signal on which said gain is impressed, and when said estimated oil temperature is not higher than the heat balance critical temperature, decreasing the driving signal on which said gain is impressed.

6. An automatic retarder controller which is mounted on a load-carrying vehicle together with a cooled retarder for exerting a braking force in response to a driving signal, and which automatically controls said driving signal so that a slope descending vehicle speed remains nearly constant, comprising:

a first means for detecting a loading weight of said vehicle; and a second means for detecting a cooling oil temperature of said retarder, the controller previously storing gains corresponding to a laden state and an unladen state of said vehicle, and a heat balance critical temperature, while controlling the vehicle speed to remain constant, determining whether the vehicle is in the laden state or the unladen state based on said detected loading weight, and impressing the gain corresponding to said determined state on said driving signal; and estimating a period of time taken before said detected cooling oil temperature reaches or exceeds the heat balance critical temperature, when said estimated period of time is less than a second reference period of time, increasing the driving signal on which said gain is impressed, and when said estimated period of time is not less than the second reference period of time, decreasing the driving signal on which said gain is impressed.

7. An automatic retarder controller which is mounted on a load-carrying vehicle together with a cooled retarder for exerting a braking force in response to a driving signal, and which automatically controls said driving signal so that a slope descending vehicle speed remains nearly constant, comprising:

a first means for detecting a loading weight of said vehicle; and a second means for detecting a cooling oil temperature of said retarder, the controller previously storing gains corresponding to a laden state and an unladen state of said vehicle, while controlling the vehicle speed to remain constant, determining whether the vehicle is in the laden state or the unladen state based on said detected loading weight, and impressing the gain corresponding to said determined state on said driving signal; and estimating an estimated oil temperature after a first reference period of time based on said detected cooling oil temperature, when said estimated oil temperature exceeds a heat balance critical temperature, increasing the driving signal on which said gain is impressed, and when said estimated oil temperature is not higher than the heat balance critical temperature, decreasing the driving signal on which said gain is impressed.

8. An automatic retarder controller which is mounted on a load-carrying vehicle together with a cooled retarder for exerting a braking force in response to a driving signal, and which automatically controls said driving signal so that a slope descending vehicle speed remains nearly constant, comprising:

a first means for detecting a loading weight of said vehicle; and a second means for detecting a cooling oil temperature of said retarder, while controlling the vehicle speed to remain constant, the controller impressing a gain corresponding to said detected loading weight on said driving signal; and estimating a period of time taken before said detected cooling oil temperature reaches or exceeds the heat balance critical temperature, when said estimated period of time is less than a second reference period of time, increasing the driving signal on which said gain is impressed, and when said estimated period of time is not less than the second reference period of time, decreasing the driving signal on which said gain is impressed.

* * * * *